(12) United States Patent
Louie et al.

(10) Patent No.: US 11,284,739 B2
(45) Date of Patent: Mar. 29, 2022

(54) STEAM MILK FROTHER

(71) Applicant: Sandora Household Electric Appliances (Shenzhen) Ltd, Shenzhen (CN)

(72) Inventors: Wai Hang Louie, Shenzhen (CN); Zhigang Zhu, Shenzhen (CN); Kwok Wai Wong, Shenzhen (CN); Marko Unger, Shenzhen (CN)

(73) Assignee: SANDORA HOUSEHOLD ELECTRIC APPLIANCES (SHENZHEN) LTD, Shenzhen (CN)

( * ) Notice: Subject to any disclaimer, the term of this patent is extended or adjusted under 35 U.S.C. 154(b) by 200 days.

(21) Appl. No.: 16/290,090

(22) Filed: Mar. 1, 2019

(65) Prior Publication Data
US 2020/0163486 A1    May 28, 2020

(30) Foreign Application Priority Data

Nov. 23, 2018  (CN) .......................... 201811410170.1

(51) Int. Cl.
*A47J 31/44*   (2006.01)
*A47J 31/46*   (2006.01)

(52) U.S. Cl.
CPC ......... *A47J 31/4489* (2013.01); *A47J 31/461* (2018.08)

(58) Field of Classification Search
CPC ................. A47J 31/4485; A47J 31/4489; A47J 31/4496; A47J 31/46; A47J 31/461;
(Continued)

(56) References Cited

U.S. PATENT DOCUMENTS 2,335,250 A * 11/1943 Adlam ................ B01F 15/0201
                                                    236/12
3,489,162 A *  1/1970 Meynell .................. B01F 5/008
                                                   137/100
(Continued)

FOREIGN PATENT DOCUMENTS

CN      104000497 A     8/2014
CN      203802270 U     9/2014
(Continued)

OTHER PUBLICATIONS

The World Intellectual Property Organization (WIPO) International Search Report for PCT/CN2019/070285 dated Aug. 1, 2019 3 pages.

*Primary Examiner* — John J Norton
*Assistant Examiner* — Simpson A Chen
(74) *Attorney, Agent, or Firm* — Anova Law Group, PLLC (57) ABSTRACT

A steam milk frother includes: a steam preparation assembly, configured to produce a stream; an injection pipe, configured to form a plurality of foams in a liquid; a steam control valve, connected between the injection pipe and the steam preparation assembly, configured to control a flow of the steam flowing through the injection pipe; and an air control valve, connected to the injection pipe, configured to control a flow of the air flowing through the injection pipe. The injection pipe includes: an inner tube connected to the steam control valve; an air channel, formed between the inner tube and an outer tube, connected to the air control valve; a shunt ring that surrounds an end portion of the inner tube and is surrounded by an end portion of the outer tube, having a plurality of shunt holes; and a lower tube disposed below the shunt ring.

11 Claims, 12 Drawing Sheets

(58) Field of Classification Search
CPC ...... A47J 31/462; A47J 31/465; A47J 31/467;
A47J 31/468; A47J 31/469; A47J 31/54;
A47J 31/58; F24D 19/081; F04F 5/461;
F04F 5/469; F16N 7/32; F01B 25/00;
F04D 25/045
USPC ...... 99/323.1, 331, 348, 489, 353, 403, 510,
99/511, 512, 513, 537, 538
See application file for complete search history.

(56) References Cited

U.S. PATENT DOCUMENTS

| | | | | |
|---|---|---|---|---|
| 5,335,588 | A | * | 8/1994 | Mahlich ............... B01F 5/0405 99/293 |
| 6,006,654 | A | * | 12/1999 | Pugh ................... A47J 31/4485 99/293 |
| 6,082,975 | A | * | 7/2000 | Lahens ................ F04D 29/023 417/406 |
| 6,786,138 | B2 | * | 9/2004 | Johnson .............. A47J 31/4489 141/82 |
| 6,997,405 | B2 | * | 2/2006 | Haruch .................... B05B 7/10 239/690 |
| 7,600,522 | B2 | * | 10/2009 | Sato ................. H01L 21/67051 134/100.1 |
| 8,935,978 | B2 | * | 1/2015 | Balestier ............. A47J 31/4489 99/323 |
| 2007/0131797 | A1 | | 6/2007 | Walter et al. |
| 2011/0070349 | A1 | * | 3/2011 | Burri .................. A47J 31/4485 426/474 |
| 2011/0239872 | A1 | * | 10/2011 | Saito .................. A47J 31/4489 99/453 |

FOREIGN PATENT DOCUMENTS

| | | | | |
|---|---|---|---|---|
| CN | 104068751 A | | 10/2014 | |
| CN | 207270261 U | | 4/2018 | |
| CN | 108497931 A | | 9/2018 | |
| GB | 2363343 A | * | 12/2001 | ......... A47J 31/4485 |

* cited by examiner

STEAM MILK FROTHER

TECHNICAL FIELD

The present invention generally relates to the field of a beverage preparation device and, more particularly, relates to a steam milk frother.

BACKGROUND

In a process of making a beverage, including making a coffee, a milk tea or more, it is often needed to add some milk foam, while a size of the milk foam, an amount of the milk foam in the beverage will both affect a taste of the beverage. Generally, if a beverage contains a plurality of dense milk foams, the taste of the beverage will be greatly improved. Currently, there is a commonly seen steam milk frother in the market, which requires an operator leaves a steam tube of the steam milk frother on a liquid surface of the beverage, waiting for the uncontrolled air mixing into the beverage, then putting the steam tube into the liquid and forming a vortex, before the liquid with the air mixed being able to form a plurality of milk foams under an action of a shear stress. On one hand, the steam milk frother described above, has relatively little air injected into the beverage, which is easy to form big but less amount of milk foams, instead of forming numerous and dense milk foams; on other hand, the steam milk frother described above is not convenient to operate, it is needed to control a leaving time of the steam tube on the liquid surface, and an angle of putting into the liquid surface, before being able to form a plurality of relatively satisfying milk foams. However, it is pretty hard for an inexperienced person to operate.

Therefore, the existing technology still needs to be improved and developed.

BRIEF SUMMARY OF THE INVENTION

In view of the above problems in the existing technology, the objective of the present invention is to provide a steam milk frother, to solve the problem in the prior art that the steam milk frothers currently used form big but less amount of milk foams, affecting a taste of the beverage being not delicate.

In order to achieve an object described above, the technical solution of the present invention is as follows:

a steam milk frother, comprising an injection pipe, connecting to a steam preparation assembly, applied to spraying a plurality of steams in a liquid and forming a plurality of foams; wherein, further comprising: a steam control valve, connecting to the injection pipe, applied to controlling a flow of the steams sprayed;

the steam milk frother, wherein further comprising: an air channel arranged in the injection pipe, and an air control valve connecting to the air channel, applied to controlling a flow of the air flowing through the injection pipe;

the steam milk frother, wherein further comprising: a fan assembly, arranged to connect the steam control valve and the air control valve, comprising:

the fan assembly is arranged with a steam chamber and an air chamber, separated by a baffle;

in the steam chamber, a first impeller is arranged, applied to rotating driven by the steam;

in the air chamber, a second impeller is arranged, connecting to the first impeller through a coupling shaft, applied to rotating synchronously;

the steam milk frother, wherein both the steam control valve and the air control valve are arranged with an automatic control, and achieving a flow mode control to both the steam and the air through a control unit;

the steam milk frother, wherein both the steam control valve and the air control valve are arranged comprising:

a valve chamber arranged in a valve body, a narrow passage is arranged in a middle of the valve chamber;

a valve plug with a thimble, arranged on one side of the narrow passage, applied to fitting and locking the narrow passage;

a knob, arranged on other side of the narrow passage, having a thimble plug arranged in the valve chamber;

the knob moves backward and forward through rotating on the valve body, pushing the thimble to open or close the narrow passage through the thimble plug;

the steam milk frother, wherein the injection pipe further comprising:

an inner tube, applied to spraying the steam;

an outer tube, arranged on an outside of the inner tube, and between the inner tube and the outer tube, the air channel is formed;

the steam milk frother, wherein in the injection pipe, it further arranges:

a shunt ring, arranged surrounding between the inner tube and the outer tube, and a plurality of shunt holes are arranged in the shunt ring;

the steam milk frother, wherein, the injection pipe further comprises:

a lower tube, arranged below the shunt ring;

the lower tube comprising: a lower outer tube, applied to connecting to the outer tube; and a lower inner tube, applied to connecting to the inner tube; on an end of the lower inner tube and the lower outer tube, a mixing chamber is formed, the mixing chamber has a liquid inlet, applied to mixing the gas and the liquid to form a plurality of foams.

the steam milk frother, wherein the mixing chamber is formed by a plurality of following structures:

in a lower end of the lower inner tube, a steam nozzle shrinking is arranged, and a plugging part is arranged between the lower inner tube and the lower outer tube, with a spray pathway arranged on the plugging part;

a cover unit is arranged covering the end of the lower inner tube and the lower outer tube, a liquid hole is arranged on a side of the cover unit, and a liquid outlet is arranged on a bottom side facing to the steam nozzle;

the steam milk frother, wherein the steam preparation assembly comprises a water tank and a heating block connected by a pipe, on a pipe at a bottom of the water tank, a check valve is arranged, applied to blocking water from flowing back, so as to form a steam pressure when the heating block is heating to form the steam.

Compared with the prior art, the present invention provides a steam milk frother, the steam milk frother arranges a steam control valve, to control a flow of the steam entering the injection pipe, being able to better control forming small and dense milk foams in the beverage. The steam milk frother, on one hand, is able to form small and dense milk foams in the beverage stably, making the beverage feel delicate and dense, improving the taste of the beverage; on other hand, owns a simple and quick operation, and it is needed only open a switch, and put the injection pipe into the liquid, before forming small and dense milk foams in the liquid, without a need to manually add air or adjust an angle of the injection tube.

DETAILED DESCRIPTION

The present invention provides a steam milk frother. To make the objectives, technical schemes and results more explicit, further description will be made in detail to illustrate the present invention. It should be understood that the specific embodiments described herein are only used to explain the present invention, and are not intended to limit the scope of the present invention.

Figure 1:
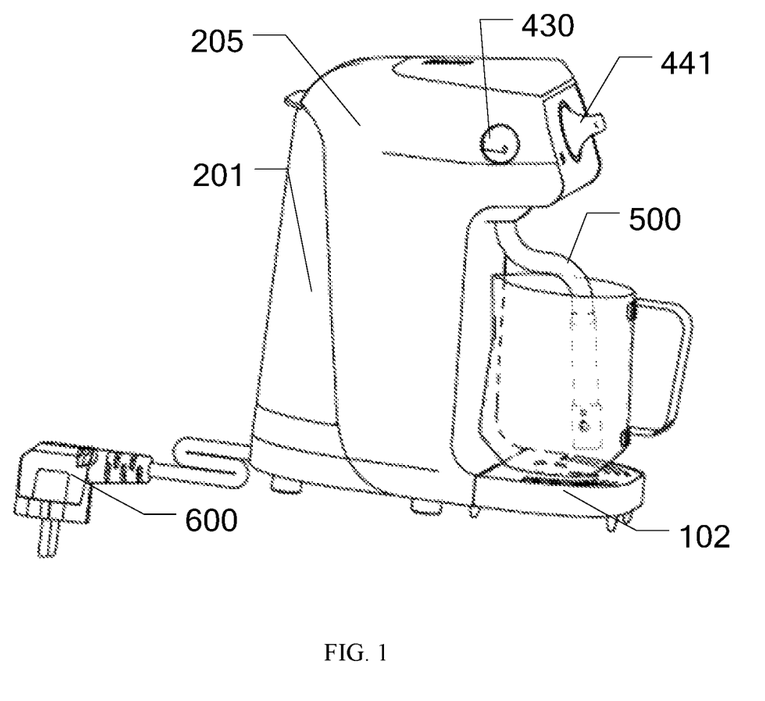
FIG. 1 illustrates a perspective view of a steam milk frother provided by the present embodiment.
Figure 2:
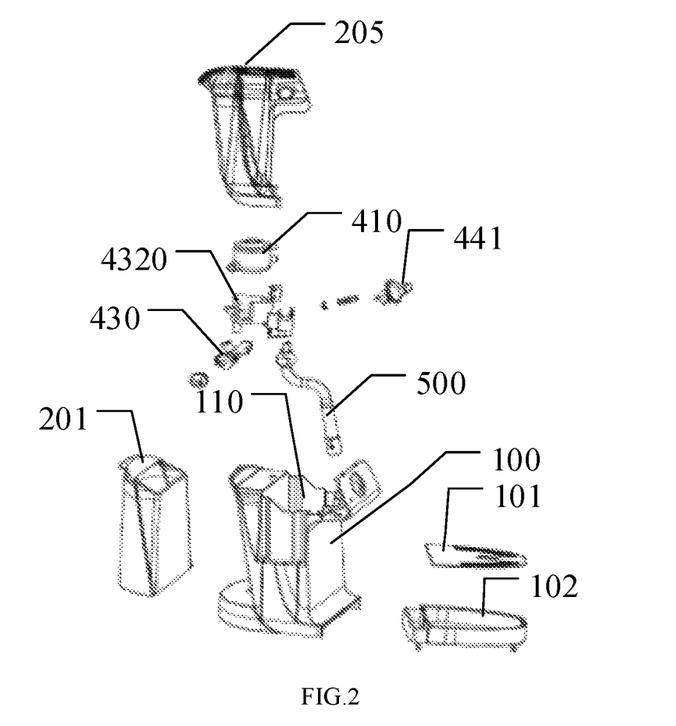
FIG. 2 illustrates an exploded view of a steam milk frother provided by the present embodiment.
Figure 3:
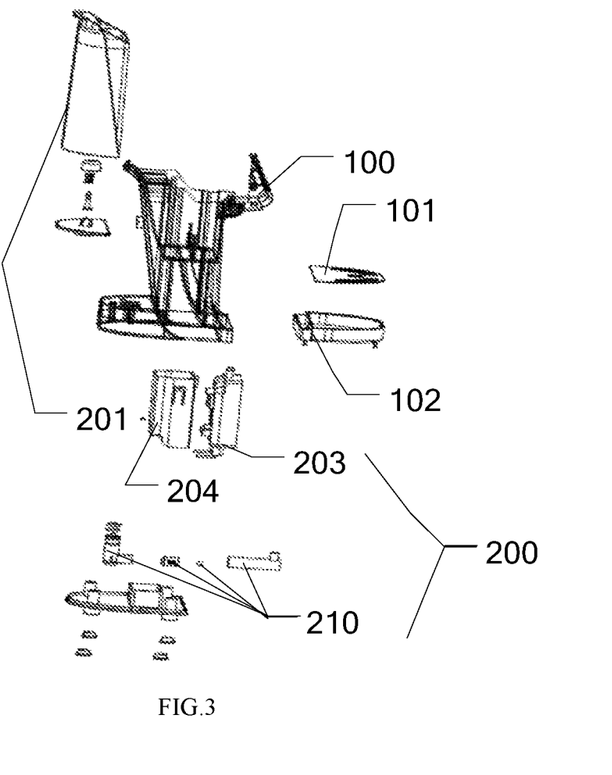
FIG. 3 illustrates an exploded view of a steam preparation assembly provided by the present embodiment.
Figure 8:
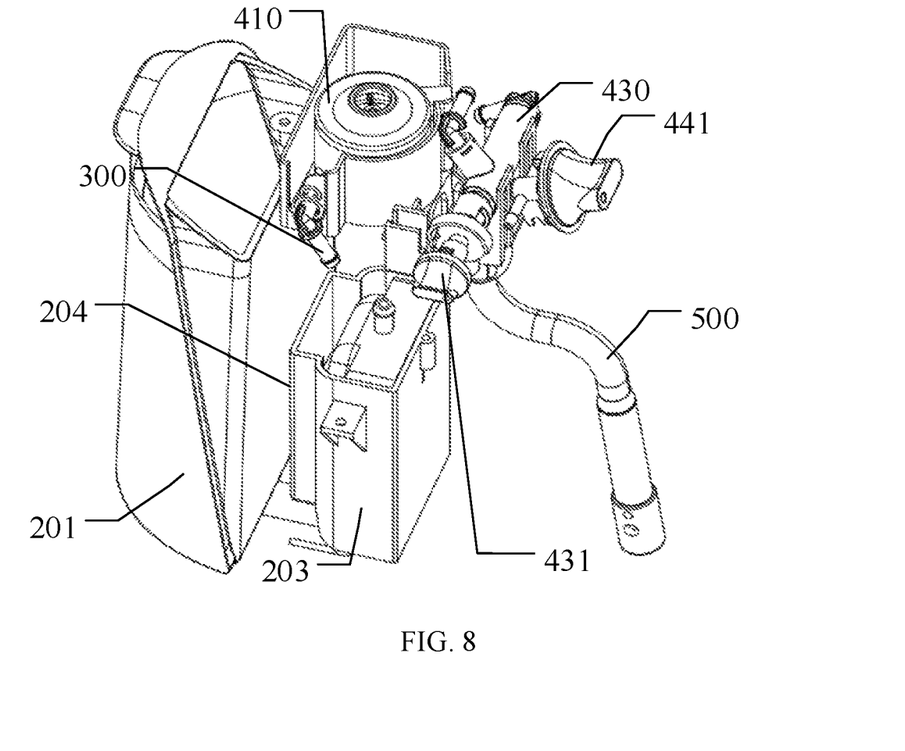
FIG. 8 illustrates an installation diagram of a steam milk frother provided by the present embodiment.

The present embodiments provide a steam milk frother, FIG. 1 illustrates a perspective view of the steam milk frother, FIG. 2 and FIG. 3 illustrates an exploded view of the steam milk frother, FIG. 8 illustrates an installation diagram of the steam milk frother. Shown as FIGS. 1-3 and FIG. 8, the steam milk frother comprises a steam preparation assembly 200, a steam pipe 300, a fan assembly 410, a steam control valve 430, an air control valve 441 and an injection tube 500, shown as FIG. 8, one end of the steam preparation assembly 200 connects to one end of the steam pipe 300. Specifically, shown as FIG. 3, the steam preparation assembly 200 comprises a water tank 201, a check valve 210, a heating block 203, and an outer shell 204 of the heating block. The water tank 201 is applied to holding water needed by generating a steam, the water tank 201 has a check valve 210 arranged in a tube on a bottom of the water tank 201, the check valve 210 is applied to blocking water from flowing back, so as to form a steam pressure when the heating block is heating to form the steam. The water tank 201 connects to one end of the check valve 210, another end of the check valve 210 connects to the heating block 203. It is possible to add water into the water tank 201 first, then the water in the water tank 201 flows to the heating block 203 through the check valve 210, the heating block 203 heats up the water and makes the water vapor. Specifically, the check valve 210 controls a water volume entering the heating block 203 through a marble in the check valve 210. Due to a weight factor, water in the water tank 201 flows to the heating block 203 through the check valve 210, when a water pressure in the water tank 201 is larger than a steam pressure in the heating block 203, the marble moves to a direction of the heating block 203, and water enters the heating block 203. When the water in the heating block 203 starts to vapor, the steam pressure in the heating block 203 goes up, pushing the marble back to an original position, to block the water from entering the heating block 203. Arranging the check valve 210 is able to control a water amount in the heating block 203, and to avoid a plurality of security problems including drying out. Additionally, the outer shell 204 of the heating block may be arranged out of the heating block 203, the heating block 203 is arranged in the outer shell 204 of the heating block, the outer shell 204 of the heating block is able to be applied to carrying and protecting the heating block 203, so as to avoid the heating block 203 from broken due to any outer forces, and being able to insulate the heat from the heating block 203, to avoid from breaking other components in the steam milk frother. Adopting the steam preparation assembly described above, it is able to generate steam fast, and it only needs to be plugged in a power source, the steam is able to be generated directly, without any need to connect to any extra steam devices, while it is able to control a steam amount well through the check valve 210, without generating too much or too little steams, as well as being able to generate the steam equally, thus being able to achieve a convenient and quick integrated operation.

Figure 6:
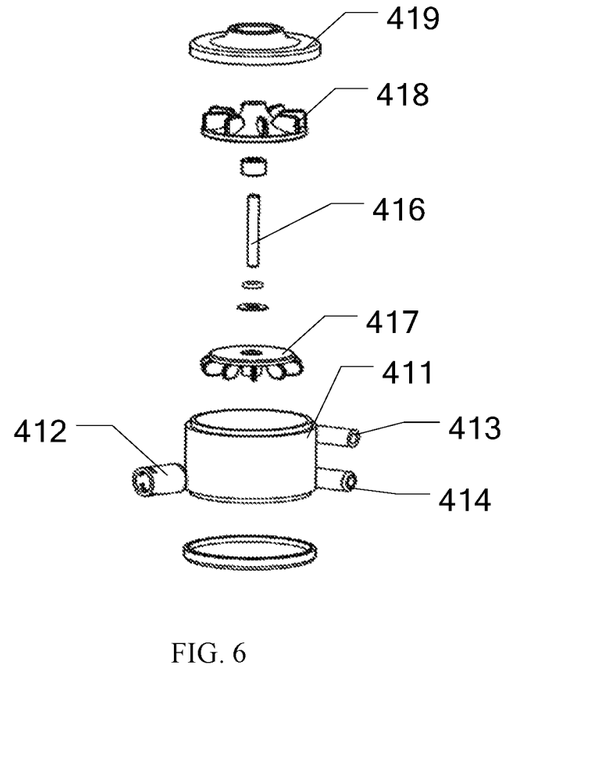
FIG. 6 illustrates an exploded view of a fan assembly provided by the present embodiment.

Shown as FIG. 8, another end of the steam pipe 300 connects to the fan assembly 410, as shown in FIG. 6, the fan assembly 410 comprises an outer shell 411 of the fan, one side of the outer shell 411 of the fan has a steam pipe inlet 412, applied to connecting to the steam pipe 300, another side has a fan air channel 413 applied to connecting and transporting the air, and a steam channel 414 arranged and applied to transporting the steam. Shown as FIG. 7, the outer shell 411 of the fan has a baffle 423 arranged in a middle of the outer shell of the fan, one side of the baffle 423 is a steam chamber 420, a first impeller 417 is arranged in the steam chamber 420, another side is an air chamber 421, a second impeller 418 is arranged in the air chamber 421. A first through hole 415 is arranged in the baffle 423, a coupling shaft 416 passes through the first through hole 415, making the first impeller 417 and the second impeller 418 connect through the coupling shaft 416, thus being able to realize a synchronizing rotation between the first impeller 417 and the second impeller 418 through the coupling shaft 416. An air chamber cover 419 is arranged out the air chamber 421, and an air through hole 422 is arranged in the air chamber cover 419, the air through hole 422 is applied to connecting to outside, and introducing outside air into the air chamber 421.

Figure 7:
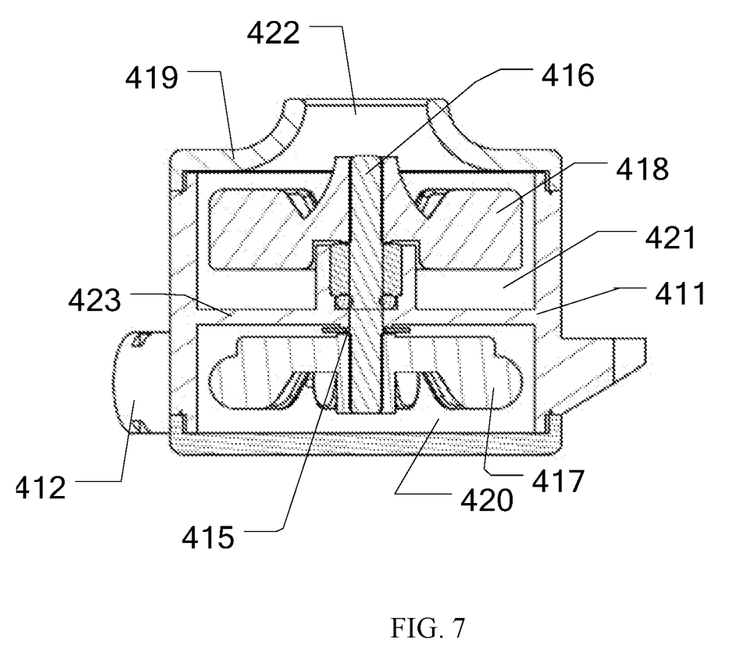
FIG. 7 illustrates a sectional view of a fan assembly provided by the present embodiment.

Wherein, one end of the steam chamber 420 connects to the steam pipe 300, the steam injected from the steam pipe 300 enters the steam chamber 420, while driving the first impeller 417 to rotate; and the second impeller 418 in the air chamber 421 also rotates accordingly, thus a low air pressure forms in the air chamber 421, and air outside is able to enter the air chamber 421 through the air through hole 422, and the air in the air chamber 421 flows out through the fan air channel 413. In the fan assembly 410, the air flows in by an air pressure in the air chamber 421 lower than an air pressure outside which is caused by the steam driving the first impeller 417, and the second impeller 418 rotates synchronously. In such a way, without arranging any other driving devices to suck in the air, a large amount of air is able to enter the device, and sucking a large amount of air is able to make a preparation for forming a large amount of the milk foams, which is favorable to form a smooth taste of the beverage.

The fan assembly 410 connects to the steam control valve 430 and the air control valve 441, as shown in FIG. 2 and FIG. 6, specifically, the steam channel 414 connects to the steam control valve 430, so that the steam can enter the steam control valve 430 through the steam channel 414, so as to adjust a volume of the steam. In a same way, the air control valve 441 connects to the fan air channel 413, so that the air can enter the air control valve 441 through the fan air channel 413, so as to adjust a volume of the air.

Figure 4:
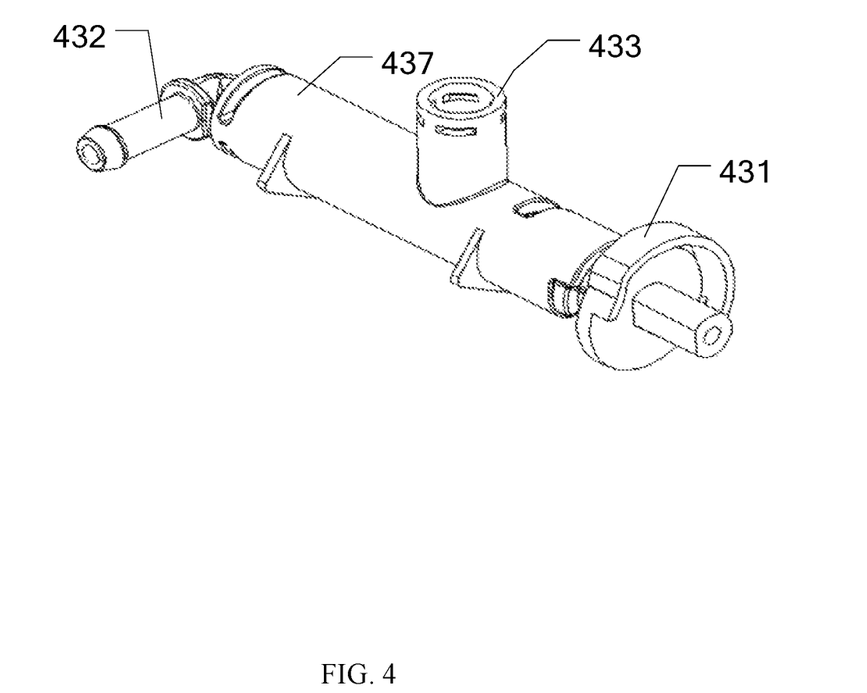
FIG. 4 illustrates a perspective view of a steam control valve provided by the present embodiment.
Figure 5:
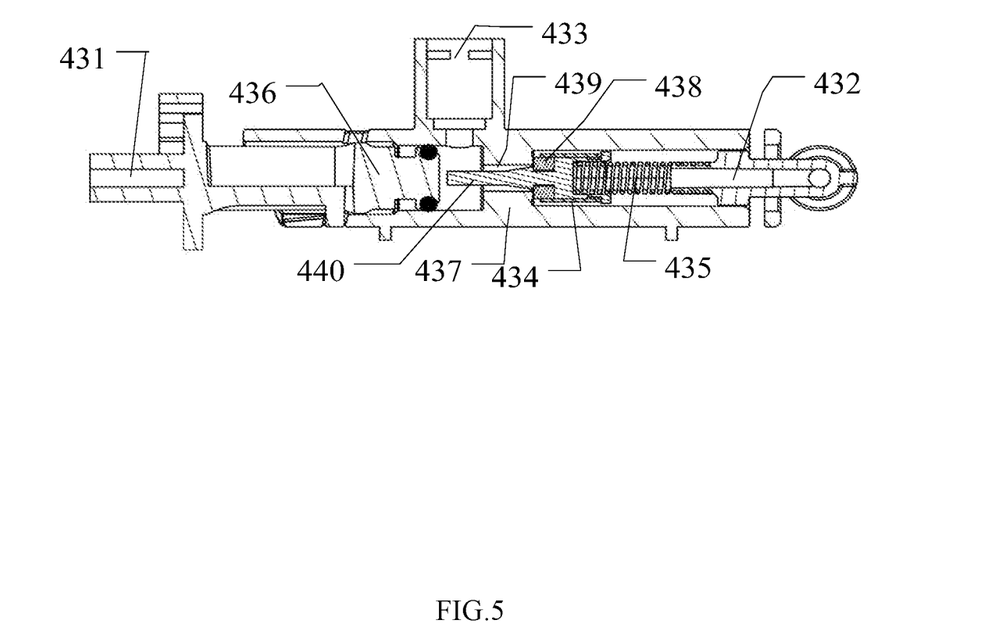
FIG. 5 illustrates a sectional view of a steam control valve provided by the present embodiment.

Shown as FIG. 4, the steam control valve 430 further comprises a valve chamber 437, one end of the valve chamber 437 has an inlet 432, and an outlet 433 is arranged at one side, shown as FIG. 5, a narrow passage 439 is arranged in the middle of the valve chamber 437, a valve plug 434 is arranged on one side of the narrow passage 439, and the valve plug 434 connects to the thimble 440, and the thimble 440 inserts into the narrow passage 439, a connection place between the thimble 440 and the valve plug 434 is wider than a tip of the thimble 440, in such a way, when moving the thimble 440, a gap appears between the thimble 440 and the narrow passage 439, and following a movement of the thimble 440, the narrow passage 439 is able to be open, thus the air is able to enter from the narrow passage 439. In addition, the steam control valve 430 further comprises a knob 431, the knob 431 has a thimble plug 436 arranged, the thimble plug 436 is arranged in the valve chamber 437, and rotating the knob 431 is able to drive the thimble plug 436 to move in the valve chamber 437, making the thimble plug 436 be able to push the thimble 440 to open/close the narrow passage 439. Detailed, the steam enters the valve chamber 437 through the inlet 432 and is controlled by the knob 431, shown as FIG. 5, rotating the knob 431 is able to drive the thimble plug 436 to move in the valve chamber 437, making the thimble plug 436 be able to touch the thimble 440, and the valve plug 434 connecting to the thimble 440 will move to a direction of the inlet 432 following the thimble plug 436, and the steam will enter the valve chamber 437 through the narrow passage 439, and flows out through the outlet 433 connected to the valve chamber 437. When the thimble plug 436 blocks the outlet 433 for the steam, the steam control valve 430 shuts down, and no steam will come out of the outlet 433. When the thimble plug 436 no more contacts to the thimble 440, under an action of a spring 435, the thimble 440 and the valve plug 434 returns to an original position. It is able to select a movement distance when driving the thimble 440, and control a size of the steam outlet 433, so as to achieve a control of a flow of the steam due to a scale on the knob 431. Preferably, a sealing ring 438 is able to be arranged at a contact place between the thimble 440 and the narrow passage 439, facilitating a sealing.

Preferably, it is able to arrange the air control valve 441 at a same time, the air control valve 441 may be realized by adopting a same method or a similar method as the steam control valve 430, thus no more details are stated herein. By controlling a flow of the steam and a flow of the air, a different ratio of the steam and the air may be realized, and a plurality of milk foams with different sizes or different amounts are formed, and after being added to the beverage, it is able to prepare a beverage with different tastes. And the steam control valve is able to be shut down, while only air is able to enter the liquid, before forming foams in the liquid, instead of heating up the liquid, in such a way, the liquid with foams is directly added to a cold drink, which will not affect a taste of the cold drink, such as a cold cappuccino, and adding directly a cold and foamed milk to an iced coffee, instead of adding a hot milk, will affect a bitterness and a sour taste of the iced coffee. In such a way, it is possible to let a user self-regulate a control valve, according to different drinks or personal tastes and habits, to prepare a beverage with a different taste. Preferably, an automatic control valve may be adopted, or a micro switch or any other circuits may be arranged on the control valve, a ratio between the air and the steam is able to be set, before controlling a flow of both according to the ratio, without any manual manipulations.

Another end of the steam control valve 430 and another end of the air control valve 441 connect to the injection tube 500, so that the steam can be prepared from the steam preparation assembly 200, before entering the fan assembly 410 through the steam pipe 300, and the air is sucked in by the fan assembly 410, while the steam control valve 430 controls a flow of the steam, and the air control valve 441 controls the air, before finally entering the injection tube 500, and forming foams from the injection tube 500, before being sprayed into the beverage.

Figure 9:
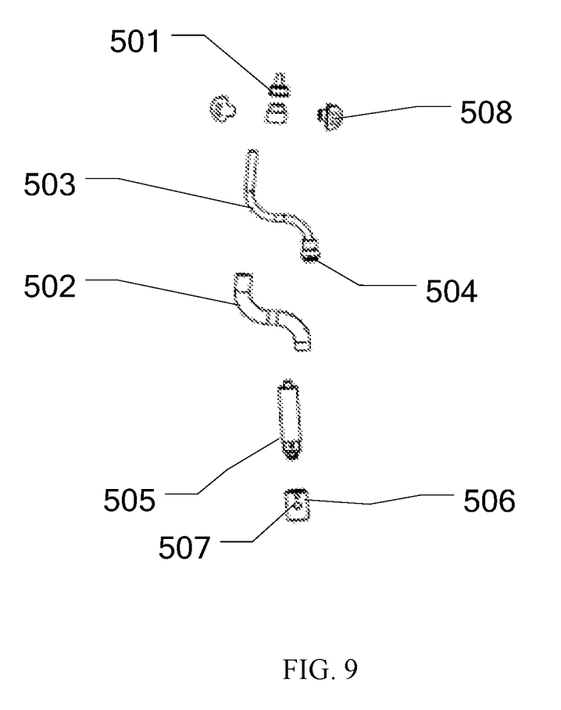
FIG. 9 illustrates an exploded view of an injection tube in the steam milk frother provided by the present embodiment.

Further, as shown in FIG. 8 and FIG. 9, the steam and the air enter the injection tube 500, which comprises an air channel 501, an outer tube 502, an inner tube 503, a lower tube 505 and a mixing chamber 506, a plurality of structures stated above are able to be arranged as a detachable structure, to facilitate dissembling and cleaning the device, or be arranged in an integrated piece. Shown as FIG. 10, the steam may enter the inner tube 503, while the outer tube 502 is arranged out of the inner tube 503, the air may enter between the outer tube 502 and the inner tube 503 through the air channel 501. A lower end of the inner tube 503 connects to a shunt ring 504, and a plurality of shunt holes are arranged in the shunt ring 504, when the air flows through the shunt ring 504, the air is getting pressurized, so as to facilitate a subsequent injection of the air into the liquid. Below the outer tube 502 and the inner tube 503, the lower tube 505 is arranged, as shown in FIG. 10 and FIG. 11, the lower tube 505 comprises a lower outer tube 509 and a lower inner tube 510, the lower outer tube 509 is covered on the outside of the inner tube 510, shown as FIG. 11, between the lower outer tube 509 and the lower inner tube 510, there can be a plugging part 511 arranged, and a spray pathway 512 is arranged on the plugging part 511, the air can be sprayed out through the spray pathway 512, forming a certain air pressure.

Figure 10:
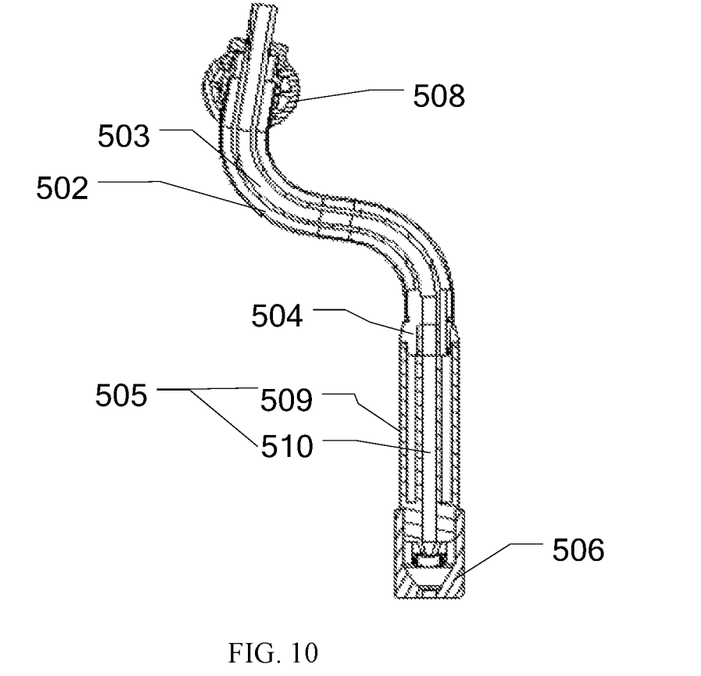
FIG. 10 illustrates a sectional view of an injection tube in the steam milk frother provided by the present embodiment.
Figure 11:
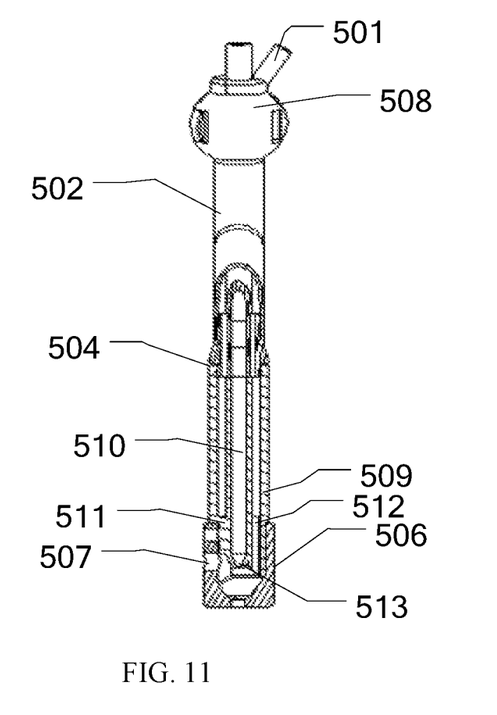
FIG. 11 illustrates a partial sectional view of an injection tube in the steam milk frother provided by the present embodiment.

Show as FIG. 10 and FIG. 11, an end of the lower tube 505, that is, an end of the lower inner tube 510 and the lower outer tube 509, has the mixing chamber 506 arranged, the air is sprayed into the mixing chamber 506 through the spray pathway 512, the steam may be sprayed directly into the mixing chamber 506 through a steam nozzle 513. Preferably, a cover unit is arranged covering the end of the lower inner tube 510 and the lower outer tube 509 as the mixing chamber, a liquid hole 507 is arranged on a side of the cover unit, and a liquid outlet is arranged on a bottom side facing to the steam nozzle 513. In such a way, it is convenient to detach the cover unit and make a clean. Shown as FIG. 9, one or a plurality of liquid holes 507 are arranged around the mixing chamber 506, when the cover unit touches the liquid, the liquid will enter the cover unit, shown as FIG. 11, the air sprayed out from the spray pathway 512, the steam sprayed out from the lower inner tube 510, and the liquid entering the cover unit, will be mixed together. Under an action of a pressure of gas (gas includes pure air, pure steam or a mixture of air and steam), air will enter the liquid, and form foams under a shear stress of a gas flow, the steam will heat the liquid in the mixing chamber up, and under a spray action of the gas, the liquid containing foams will be sprayed to the liquid from the mixing chamber, before forming dense and small foams. If the liquid does not need to be heat up, such as preparing milk foams for a cold extracted coffee, then the steam control valve 430 is turned off, and both the inner tube 503 and the lower inner tube 510 have no steams passing through, the air will still get pressurized through the shunt ring 504 and the spray pathway 512, before spraying into the mixing chamber, and entering the liquid in the mixing chamber, acting as foams. The liquid entering the mixing chamber and containing the foams enters a liquid in a container, such as milk, forming a plurality of milk foams, without heating the milk up, thus it is able to form small and dense foams in a cold beverage. Thus it is possible to select a hot drink or a cold drink according to a user's habit.

Figure 12:
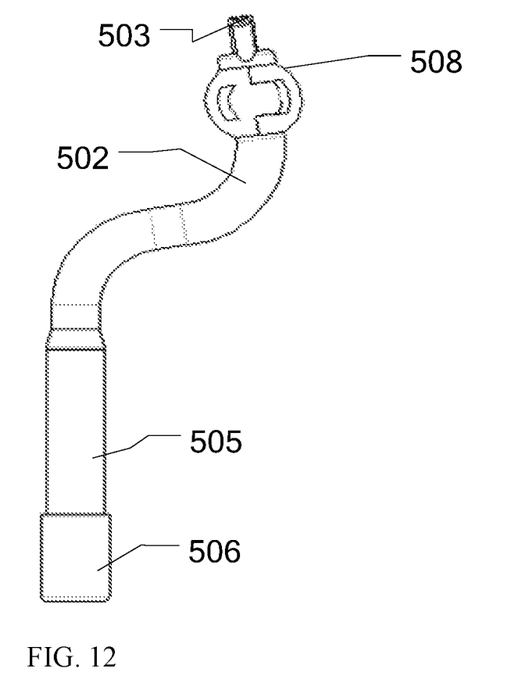
FIG. 12 illustrates a bottom view of an injection tube in the steam milk frother provided by the present embodiment.

Preferably, shown as FIG. 10-FIG. 12, an outer side of the injection tube 500 has a spherical protect component 508 arranged, the protect component 508 can be applied to protecting the injection tube 500 from wearing and tearing in a rotation, the protect component 508 may adjust an angle of the injection tube, facilitating an operator to adjust an angle of the injection tube according to his own requirement, preferably, the protect component may be hold by two hemispherical parts, so as to facilitate to adjust the angle of the injection tube.

The steam milk frother further includes a base 100 and a base outer shell 205, it is possible to arrange a steam preparation assembly, the steam pipe 300, the steam control valve 430, the air control valve 441 and the injection tube 500 to be mounted on the base 100, so as to collect and concentrate all the components stated above, and connect to each other, facilitating the operator to use in an integrate way. Shown as FIG. 2, preferably, the steam milk frother further comprises the base outer shell 205, the base outer shell 205 engages with the base 100, the base outer shell 205 is able to be applied to protect the base 100 and a plurality of inner components placed on the base 100, the base 100 and the base outer shell 205 may form an accommodation space, the accommodation space may be applied to protecting the inner components in the device.

The base 100 opens on the top, forming a chamber 110, the fan assembly 410, the steam control valve 430 and the air control valve 441 are arranged in the chamber 110, shown as FIG. 2, preferably, the base 100 has a placement rack 4320 arranged, and the fan assembly 410, the steam control valve 430 and the air control valve 441 are arranged on the placement rack 4320.

The base 100 further comprises a water leakage plate 101 and a water storage box 102. The water leakage plate 101 is arranged on the base 100 and beneath the injection tube 500. The water leakage plate 101 has a plurality of through holes arranged, applied to leaking the water; the water storage box 102 is arranged on the base 100, below the water leakage plate 101, and engaging with the water leakage plate 101, applied to collecting the water leaked from the water leakage plate 101.

Preferably, shown as FIG. 1, the steam milk frother further comprises a power plug 600, the power plug 600 may be applied to connecting to a power source, so as to make the steam milk frother start to work.

Below is a detailed embodiment, applied to illuminating a usage process of the steam milk frother, add water to the water tank 201 to a certain scale, start the steam milk frother after connecting to a power source 600, water in the water tank 201 is transported to the heating block 203 from the water tank through the check valve 210, before being heated by the heating block 203 and vapored to steam, the steam enters the steam chamber 420 in the fan assembly through the steam pipe 300, drives the first impeller 417 to rotate, the first impeller 417 drives the second impeller 418 to move through the coupling shaft 416, a movement of the second impeller 418 makes an air pressure in the air chamber 421 lower than the air pressure outside, thus a big amount of air enters the air chamber 421. The air and the steam flow out of the fan assembly and flow respectively into the air control valve 441 and the steam control valve 430. Adjusting the air control valve 441 and the steam control valve 430 can achieve a different ratio between the air and the steam, so as to form milk foams with different sizes and different amounts, thus achieving a preparation of drinks having different tastes. The air and the steam enter the injection tube 500 through the control valve. The steam enters the lower inner tube 510 through the inner tube 503, before being sprayed into the mixing chamber, while the air enters the injection tube 500 through the air channel, before entering the mixing chamber, the mixing chamber may further introduce the liquid, while the air and the liquid are mixed in the mixing chamber, forming foams, before being sprayed into a drink, bringing a swirl to the liquid, and forming a plurality of small and dense milk foams by a shear stress. When it is needed to get a cold drink, the steam control valve 430 will be shut down, and only air enters the injection tube 500, the air is pressurized by the shunt ring 504 and the spray pathway 512, before being sprayed into the mixing chamber, and forming foams in the mixing chamber, and finally being sprayed into the drink together with air.

All above, the present embodiments provide a steam milk frother, the steam milk frother arranges a steam preparation device, being able to generate the steam conveniently, without connecting to any extra steam preparation apparatus, additionally, by the fan assembly, the steam milk frother has air mixed up, facilitating the air to enter the liquid, and form foams. The steam milk frother further has a steam control valve 430 and an air control valve 441 which are both adjustable, so as to control a flow ratio of the steam and the air, to adjust in time an amount of the milk foam according to a requirement of a drink, before being sprayed into a drink liquid from the injection tube 500, to form small and dense milk foam. And it is even possible to shut down the steam control valve 430, thus the injection tube 500 will spray air only into the liquid, thus it is possible to be applied in making a cold drink without heating up the liquid. Designing the shunt ring 504 and the spray pathway 512, makes the air being able to be pressurized in the injection tube 500, thus even having no steam, it is still possible to form small and dense milk foams. Further utilizing the mixing chamber, it is able to mix the air and liquid in advance, and form milk foams before entering the drink, making the milk foams more equal and dense. The steam milk frother enables a user be able to independently adjust an amount of the air intake and an amount of the steam intake according to different types of drinks or different personal tastes and habits, which even is able to control a ratio of both automatically, to achieve a control to an amount and a size of the milk foams, thus it is able to prepare drinks with different tastes. The steam milk frother is easy to operate, and requires no experienced operator to operate, before forming stably small and dense milk foams, and a prepared beverage owns a delicate, fine and smooth taste.

It should be understood that the application of the present invention is not limited to the above examples and can be improved or transformed by those skilled in the art based on the above description. All these improvements and transformations should fall within the protection scope of the appended claims of the present invention.

What is claimed is:

1. A steam milk frother, comprising:
a steam preparation assembly, configured to produce a stream;
an injection pipe, configured to form a plurality of foams in a liquid;

a steam control valve, connected between the injection pipe and the steam preparation assembly, configured to control a flow of the steam flowing through the injection pipe; and an air control valve, connected to the injection pipe, configured to control a flow of the air flowing through the injection pipe, wherein the injection pipe comprises:
an inner tube connected to the steam control valve;
an outer tube sleeved outside the inner tube;
an air channel, formed between the inner tube and the outer tube, connected to the air control valve;
a shunt ring that surrounds an end portion of the inner tube and is surrounded by an end portion of the outer tube, the shunt ring being disposed within the air channel formed between the inner tube and the outer tube and having a plurality of shunt holes configured to pressurize the air in the air channel; and
a lower tube disposed below the shunt ring, comprising:
a lower steam spraying tube connected to the outer tube;
a lower air spraying tube connected to the inner tube; and
a mixing chamber formed on an end of the lower steam spraying tube and the lower air spraying tube, the mixing chamber having a liquid inlet and being configured to mix the liquid with air to form foams;
a steam nozzle disposed at the end of the lower steam spraying tube and shrinking the end;
a plug disposed between the lower steam spraying tube and the lower air spraying tube;
a spray pathway formed between the lower air spraying tube and the lower steam spraying tube that is not blocked by the plug; and
a cover configured to cover the end of the lower air spraying tube and the lower steam spraying tube, wherein a liquid hole is arranged on a side of the cover, and a liquid outlet is arranged on a bottom of the cover facing to the steam nozzle.

2. The steam milk frother according to claim 1, further comprising: a fan assembly arranged to connect the steam control valve and the air control valve, comprising:
a steam chamber;
a first impeller arranged in the steam chamber and configured to rotate when being driven by the steam from the steam preparation assembly;
a steam channel configured to transport the steam to the steam control vale;
an air chamber; and
a second impeller arranged in the air chamber and connected to the first impeller through a coupling shaft, configured to rotate synchronously with the first impeller and guide outside air into the air chamber.

3. The steam milk frother according to claim 1, further comprising: a controller circuit configured to automatically control a flow of the steam through the steam control valve, and automatically control a flow of the air through the air control valve.

4. The steam milk frother according to claim 3, wherein: the controller circuit is further configured to turn off the steam control valve when the liquid is a cold drink.

5. The steam milk frother according to claim 3, wherein: the controller circuit is further configured to turn on the steam control valve when the liquid is a hot drink.

6. The steam milk frother according to claim 1, wherein: the flow of the steam through the steam control valve is controlled by rotating a first knob disposed in the steam control valve; and the flow of the air through the air control valve is controlled by rotating a second knob disposed in the air control valve.

7. The steam milk frother according to claim 1, wherein the steam control valve and the air control valve respectively comprises:
a valve chamber arranged in a valve body, wherein a narrow passage is arranged in a middle of the valve chamber;
a valve plug with a thimble, arranged on one side of the narrow passage, configured to fit and lock the narrow passage;
a knob, arranged on the other side of the narrow passage, having a thimble plug arranged in the valve chamber; wherein the knob moves backward and forward through rotating on the valve body, pushing the thimble to adjust the narrow passage through the thimble plug— according to a required flow rate.

8. The steam milk frother according to claim 1, wherein the steam preparation assembly comprises a water tank and a heating block connected by a pipe, wherein on the pipe at a bottom of the water tank, a check valve is arranged, applied to block water from flowing back, so as to form a steam pressure when the heating block is heating to form the steam.

9. The steam milk frother according to claim 1, wherein the gas in the mixing chamber is the air, the steam or a mixture of the air and the steam.

10. The steam milk frother according to claim 9, wherein a ratio between the air and the steam in the mixture of air and steam is achieved by adjusting the air control valve and the steam control valve.

11. The steam milk frother according to claim 1, further comprising:
a protect component arranged at an outer side of the injection pipe and including two hemispherical parts, configured to adjust an angle of the injection pipe, and protect the injection pipe from wearing and tearing in a rotation.

* * * * *